United States Patent [19]
Harsham et al.

[11] Patent Number: 6,041,347
[45] Date of Patent: Mar. 21, 2000

[54] COMPUTER SYSTEM AND COMPUTER-IMPLEMENTED PROCESS FOR SIMULTANEOUS CONFIGURATION AND MONITORING OF A COMPUTER NETWORK

[75] Inventors: Bret Harsham, Newton; Lalit Jain, Boston, both of Mass.

[73] Assignee: Unified Access Communications, Boston, Mass.

[21] Appl. No.: 08/957,048

[22] Filed: Oct. 24, 1997

[51] Int. Cl.[7] .............................. G06F 15/00; G06F 15/40; G06F 9/44

[52] U.S. Cl. ......................... 709/220; 709/223; 709/227; 709/228; 707/103

[58] Field of Search .................................... 709/220, 223, 709/227, 228; 707/103

[56] References Cited

U.S. PATENT DOCUMENTS 5,327,560  7/1994  Hirata et al. ............................. 709/221
5,414,812  5/1995  Filip et al. ............................... 707/103

*Primary Examiner*—Krisna Lim
*Attorney, Agent, or Firm*—Wolf, Greenfield & Sacks, P.C.

[57] ABSTRACT

A centralized computer network management system that simultaneously configures and monitors computers in a computer network. The computer network management system allows a network administrator to describe the computer network according to both its physical topology and logical groups of machines and users in the computer network. Each network device, computer, or groups of network devices and computers can be associated with one or more rules which define configuration parameters. These rules may be inherited by machines through both the physical and logical relationships of the machines in the computer network. This centralized administration of the computer network simplifies the task of configuring and monitoring the network. All machines in the computer network also can be configured or monitored simultaneously.

26 Claims, 11 Drawing Sheets

```
class NetObject {
public:                        /-220
   Dlisto<int> Children;  /  /-222
   Dlisto<int> InGroups; /   // list of groups of which is obj is a member // rules that apply to this object, server and client
   Dlisto<RuleUse*> * Rules; ~224
              /-226
   int ID;/            /-228
   int Parent; // ID of parent object
};
```

Fig. 6A

```
class NetIPObject : public NetObject {
public:                     /-230
   Cstring IPA;    // IP address      /-232
   CString MinIP;  // minimum IP address /-234
   CString MaxIP;  // maximum IP address
   CString Bcast;  // broadcast IP address, need for routing /-236
                   // bcast packets        /-238
   CString Gateway; // gateway for IP packets
   CString Netmask; // need for external gateway routing ~240
};
```

Fig. 6B

```
class SubnetSpec: public NetIPObject     // data about a pn7
{                                                          250
public:
   int              RemoteEnable; // required for remote configuration
   DListo<CString>  RemoteC;  // IP's of remote PN's which can configure
   int              EtherCAEnable; // required for ethernet config
   CString          EtherCA; // IP of ether CA (must be on ETH1)  } 252
   int              Lans;    // number of LAN ports (1-3)          254
   CString          SiteID  // 10 character id of site     258  256
   int              PNport; // port to listen on    262   260
};
```

Fig. 6C

```
class NetSpec : public NetObject // object representing the umbrella
{                                                       /-200
public:
   u_char    InternalAllowP; // default internal rule
   u_char    LogIntranet;   // log intranet traffic?  206  204
   u_char    LogExtranet;   // log extranet traffic?  202
   u_char    ExternalAllowP; // default external rule
   int       RouteNonIP; // what we do with non-ip packets  208
   int       BlockBcastP;/-210      /-212
   int       Encrypt; // type of enctyption                    214
   UINT2     VendorPort; // port for vendor to talk to us (def 2223)
   UINT2     UmbrellaPort; // port for umbrella to talk on (def 2222)
};                                                              216
```

Fig. 6D

```
class RuleUse {
public:         270              272
    int RuleID;                      274
    int Type;   // see types above...
    int ObjectID; // where it is applied RuleUse() : RuleID(-1),Type(-1),ObjectID(-1)  {}
};
```

Fig. 8A

```
class ObjRule
{      280                                  282
    int ID;
    u_char  Allow;  // allow or drop packets
    u_char  Disable; // disable rule? 284
    int  log; // to log or not to log... 286
    UINT2   Network;  // IP, IPX ... 288
    UINT2   Transport; // TCP, UDP ... 290    292
    DListo<int> * Servers; // list of servers for this rule  294
    DListo<int> * Clients; // list of clients for this rule
    ServiceList Services; // what's actually allowed by this rule (see below)
                                                              296
```

Fig. 8B

```
class ServiceMap {
public:
    char * Service;  300                        302
    DListo<Port> * SPortlist; // list of server ports
    DListo<Port> * CPortlist; // list of client ports
};                                                  304
```

Fig. 8C

```
struct Filter {              310
    int pass;    // allow or block  312
    int log;     // log this packet?
    location_code from; // where the packet came from
                                                    314
              316
    location_code to;
                                                        318
    struct Host Dest; // where the packet says it came from
    struct Host Source; // where the packet says it is going
    // Protocols                   322                      320
    UINT2 Network;    // IP, IPX, etc.
    UINT2 Transport;  // TCP, UDP, etc.
};                                        324
```

Fig. 9

```
for this pn7 (P):              /300
    for each active local area network (L) of P:  /302
        for each descendant (D) of the local area network: /304
            add a route for D with D's address range /306
            (single IP objects get a range where the min and  /308
            max are the same) and the destination code for L.
for each pn7 P in the umbrella:          310
    for each descendant D of the pn7 P:    312
        add a route for D with D's address range
        (single IP objects get a range where the min and   /314
        max are the same) and the destination code for P.
```

Fig. 10A

```
for this pn7 (P)  /320
    for each active local area network (L) of P: /322                    324
        make a list of descendants of L such that the closest descendants
            are at the back of the list         /326
        for each descendant (D) on the list: /328
            Add Relevant Filters for D (see below).
    Add Relevant Filters for P (see below).      /330
Add Relevant Filters for the Umbrella (see below).  /332
```

Fig. 10B

```
make a list of all rules that may apply to an object O by: /340
    list object and all ancestors, nearest first. /342   /344
    for each, add all rules for that object to the list.
for each Rule R on the list:    /346   /348
    if O is a server for this rule,
        for each client C for this rule  /350    /352
            Apply this rule to server O, client C.
    if O is a client for this rule, /354
        for each server S for this rule  /356
            Apply this rule to server S, client O. /358
```

Fig. 10C

```
    generate 2 filters F1,F2 for this use of the rule by. /360
        generate location code for S, fill in /362
            from F1 and to F2.
        generate location code for C, fill in /364
            from F2 and to F1.
        generate address range of S fill in /366
            source F1, dest F2.
        generate address range of C, fill in /368
            source F2, dest F1.
        fill in network and transport code for R /370
            in F1 and F2.
        for each server port range of R: /372
            fill in sourec F1, dest F2. /374
            for each client port range of R: /376
                fill in source F1, dest F2. /378
                Add F1 and F2 to the filter table. /380
```

Fig. 10D

COMPUTER SYSTEM AND COMPUTER-IMPLEMENTED PROCESS FOR SIMULTANEOUS CONFIGURATION AND MONITORING OF A COMPUTER NETWORK

FIELD OF THE INVENTION

The present invention is related to computer network management systems, particularly systems for configuring and monitoring of machines, including both computers and network devices, in a computer network.

BACKGROUND OF THE INVENTION

A computer network becomes disproportionately more difficult to manage as it increases in size, complexity and geographic dispersion. Management of the network involves configuration of software available on the machines or for a user in the network, coordination of access to shared resources and implementation of security measures. In addition, communication traffic on the computer network is monitored to ensure that the system is appropriately configured to reduce security risks and to improve efficiency.

Most computer networks are configured by setting various configuration parameters for each machine or user in the computer network. Configuration parameters may include data indicating which software is available on each machine or for each user of the computer network. Configuration parameters also may specify security controls which limit, or permit, access to the computer networks.

With most computer networks, configuration parameters are established and maintained by an individual, often called a network or system administrator. This person typically is substantially skilled in computer networking technology. This person typically uses some software that commonly is supplied with a given network device in order to configure the network device. Each network device typically is configured separately. Similarly, software configuration typically is performed by modifying configuration files associated with an individual user. Management of very large computer networks that are geographically dispersed is a difficult task with these methods. Moreover, there is a significant possibility for error, particularly in establishing security or access control, when several machines are configured separately.

SUMMARY OF THE INVENTION

The present invention provides a centralized computer network management system that simultaneously configures and monitors computers in a computer network. The computer network management system allows a network administrator to describe the computer network according to both its physical topology and logical groups of machines and users in the computer network. Each network device, computer, or groups of network devices and computers can be associated with one or more rules which define configuration parameters. These rules may be inherited by machines through both the physical and logical relationships of the machines in the computer network. This centralized administration of the computer network simplifies the task of configuring and monitoring the network. All machines in the computer network also can be configured or monitored simultaneously.

Accordingly, one aspect of the present invention is a computer implemented process for simultaneously configuring parameters of devices in a computer network. In this process, a hierarchy of logical groups of objects corresponding to machines and groups of machines in the computer network are defined. Rules associated with the objects also are defined, wherein a rule specifies a type of traffic, a communication protocol, and indication of whether the rule is associated with the object acting as a sender or as a receiver of information, wherein each object inherits all rules associated with each group in which it is a member. The defined rules are processed to produce a set of control parameters for machines in the computer network. The control parameters then are applied to machines in the computer network.

In one embodiment, the parameters of the machines are configuration parameters of software to be executed on the machines. In another embodiment, the parameters of the machines are security configuration parameters indicating permitted and prohibited communication paths between machines in the network.

Machines may be organized by groups and rules defining configuration parameters may be defined for a group, wherein such configuration parameters are inherited by all machines within the group. A group may defined by a common physical connection. A group may contain a collection of machines that are not within the same physical group. The groups may be defined as groups of groups of machines, wherein rules defined by one group are inherited by all machines within any subgroups.

Another aspect of the present invention is an object-oriented computer system for representing a computer network. The system defines an abstract network object class. A logical network object group class is a subclass of the abstract network object class. An instance of the logical network object group class has a collection of objects in the abstract network object class and a collection of rules defining configuration parameters for objects and the collection of objects. The system also defines a physical network object group class, which is a subclass of the abstract network object class. An instance of the physical network object group class has a collection of objects in the physical network object class and a collection of rules defined for the physical network object group. The system also defines a physical network device class which is a subclass of the abstract network object class. An instance of the physical network device class has a set of rules defining configuration parameters of the network device.

In one embodiment, each network object instance includes a method for translating and inheriting rules to define the configuration parameters for the network device. In another embodiment, the object-oriented system includes means for monitoring communication activity on the computer network, including means for logging all communication activity and means for sorting the logs of communication activity by network object. In another embodiment, the object-oriented system includes means for providing simultaneous configuration of all of the network devices using the rules defined for each network device in the computer network.

Another aspect of the present invention is a computer system for monitoring traffic of communication among machines in a computer network. The system defines distributed logical groups of machines in the computer network, wherein a group is defined by a collection of a machines in the network and has associated rules defining configuration parameters of the machines. Each machine has a log of communication information. The system compiles communication information for each distributed logical group within the computer network. In one embodiment, the system simultaneously configures communication paths in the communication network according to communication traffic information. The configuration parameters may be security parameters.

Another aspect of the present invention is a method for configuring a computer network. The method involves defining a hierarchy of logical groups of distributed network objects corresponding to machines and groups of machines in the computer network. Configuration rules associated with the network objects are defined. The defined rules are processed to produce a set of parameters for the machines and groups of machines in the computer network. The parameters are simultaneously applied to two or more machines in the computer network. In one embodiment, each rule may be a security rule which specifies a type of traffic, a communication protocol, and indication of whether the rule is associated with the network object acting as a sender or as a receiver of information. In another embodiment, a network object may be used to define a logical group of distributed network objects. The network objects may be defined as a hierarchy of logical groups. A logical group may include another logical group. In another embodiment, a rule may specify a configuration of the machine or group connected to the object associated with the rule.

Another aspect of the present invention is a graphical user interface. The interface includes a display for displaying a list view illustrating the computer network using a hierarchical outline and a topological view, associated with the outline view, which shows, for a selected object, objects connected to or associated with the selected object. The list may be expanded or contracted to show connectivity or association in the network at several levels of the hierarchy. An object may be selected in the topological view to change the selected object in the list view. An object may be selected in the list view to change the selected object in the topological view.

BRIEF DESCRIPTION OF THE DRAWINGS

In the drawings,

FIGS. 6A, 6B, 6C and 6D illustrate data structures representing objects and groups of objects in the computer system;

FIGS. 8A–8C illustrate data structures for representing actions associated with objects;

FIG. 9 illustrates a data structure representing a filter for a network device; and FIGS. 10A, 10B, 10C, and 10D is a flow chart describing how the representation of the computer network is analyzed to define configuration parameters, particularly filters.

DETAILED DESCRIPTION

Figure 1:
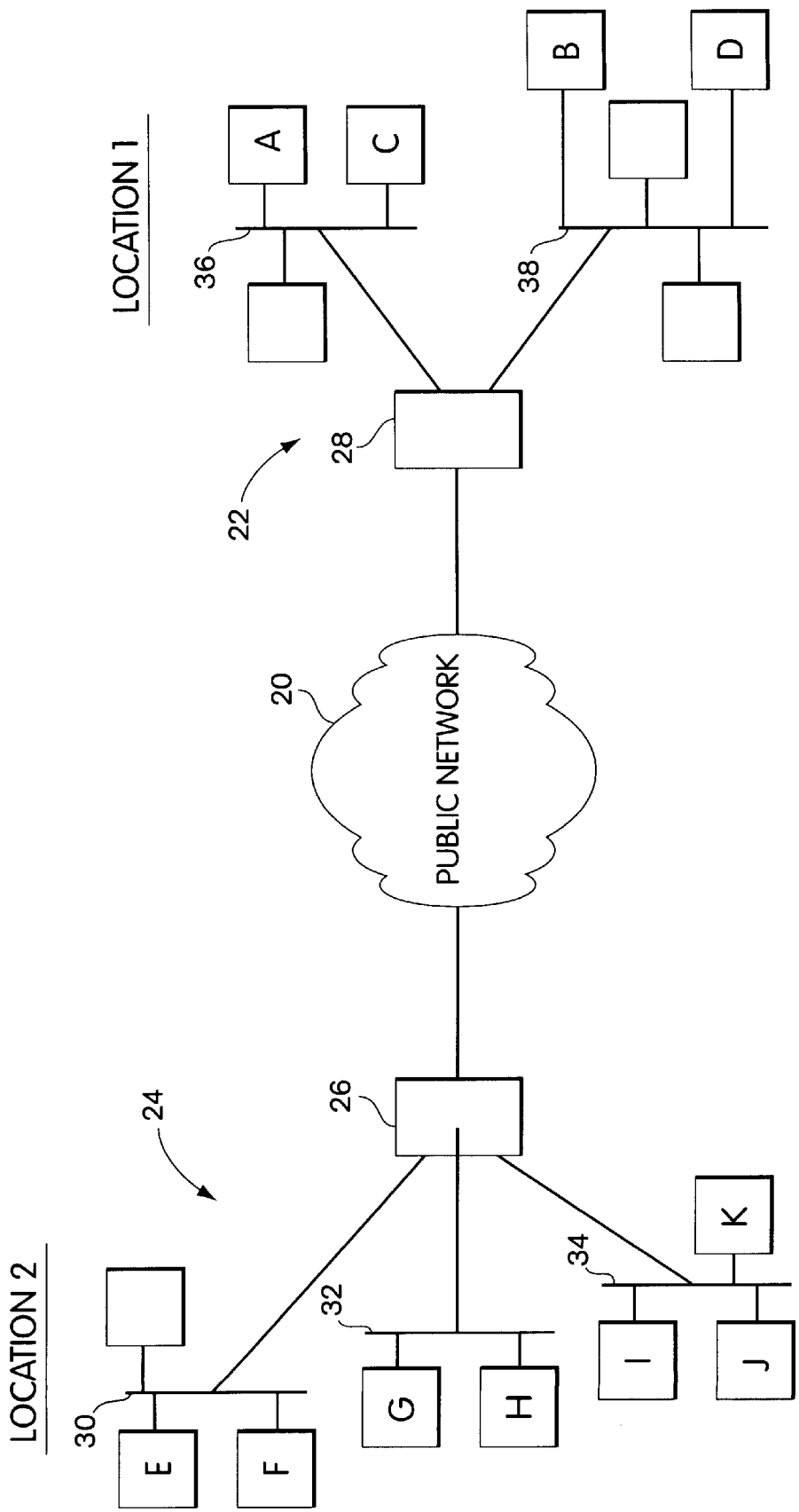
FIG. 1 is an illustration of an example computer network for which the present invention may be used.

FIG. 1 shows an example computer network with which the invention may be used. The computer network shown is a wide area network that utilizes a public computer network 20, such as the Internet, to connect local area computer networks at a first location 22 and local area computer networks at a second location 24. Communications between network devices 26 and 28 over the public computer network 20 may be encrypted and may use authentication to establish a virtual private network between the first and second locations. At the first location, the network device 28 connects to two local area networks (LANs) 36 and 38. Similarly, network device 26 is connected to three LANS 30, 32 and 34 at the second location. Each LAN is comprised of several computers, several of which are lettered in this figure using letters A through K. The computer network may have any arbitrary topology and can be comprised of a number of computers as well as network devices such as switches, routers, gateways, firewalls, etc., and other resources such as file servers, printers, etc.

While FIG. 1 illustrates the physical topology of the network, the actual use of the computer network by various individuals and groups of individuals within an organization typically does not correspond directly to this physical connectivity. In fact, within an enterprise, individuals may belong to one or more groups (such as a development group or management), and some resources may be shared by many groups. Accordingly, in the present invention, various logical groups of individual machines and groups of machines in the computer network may be defined.

Figure 2:
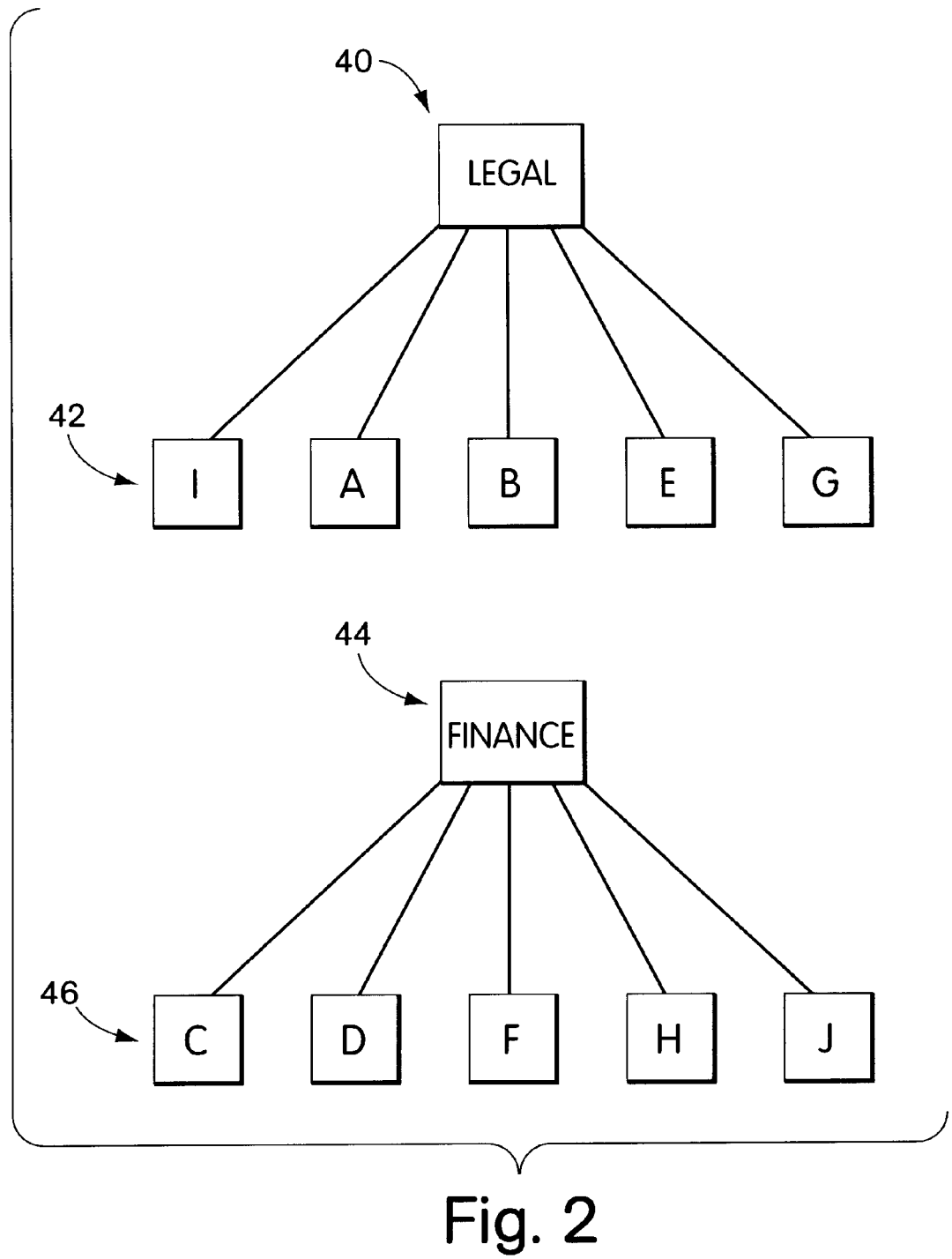
FIG. 2 illustrates an example of logical groups of distributed machines in the network.
Figure 3:
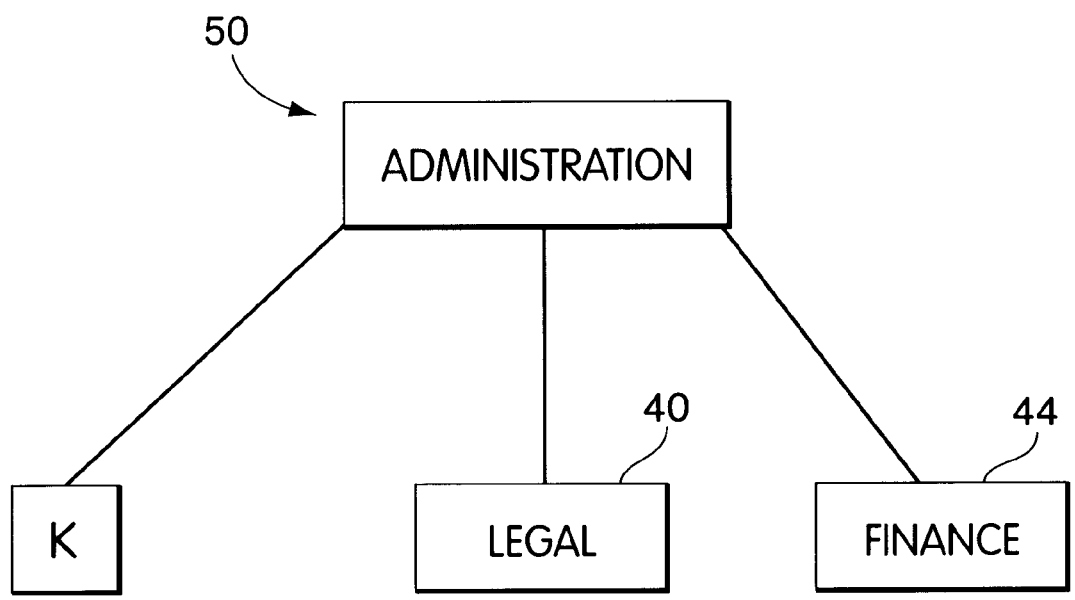
FIG. 3 illustrates conceptually a logical group including logical groups in the network.

For example, as shown in FIG. 2, a logical group of objects 40, herein labeled "legal" may include several machines within the network such as machines A, B, E, G and I as shown at 42. Similarly, another group 44, "finance," may include machines C, D, F, H and J as indicated at 46. It is also possible for logical groups to be defined by grouping together other logical groups, as well as other machines. For example, a logical group "administration" labeled 50 in FIG. 3, could be comprised of the legal group 40, finance group 44 and machine K. Note that a machine also may represent an individual user as well. Such logical groups may include an entire LAN such as LAN 30 in FIG. 1, or an entire location such as defined by network device 26. One form of network device with which the invention may be used is described in U.S. Pat. application Ser. No. 09/138,959, filed on Aug. 24, 1998 which is a continuation of the U.S. patent application Ser. No. 08/957,352 now abandoned, titled, "NETWORK DEVICE FOR SUPPORTING CONSTRUCTION OF VIRTUAL LOCAL AREA NETWORKS ON ARBITRARY LOCAL AND WIDE AREA COMPUTER NETWORKS," filed on even date herewith, by Lalit Jain and Michael T. Ford.

In order to allow such a definition of a computer network, the computer system represents the computer network using various data structures to represent each of the kinds of objects and their connectivity within the network. These data structures may be defined in an object-oriented computer system environment to take advantage of the inheritance and class hierarchy available in object-oriented systems. Objects defining the machines in the network will now be described in connection with FIGS. 4 through 6D. Associated actions and corresponding filters will be described in more detail below in connection with FIGS. 7 through 9. The process of defining a configuration based on the network description and actions will be described below in connection with FIG. 10.

In this system, data objects may be defined for individual computers, local area networks (LAN), gateway objects, other network devices, and logical groups. The public network, such as the Internet, and another physical grouping called a site (which is associated with a network device such as 26 or 28), also may be provided. The entire enterprise also is represented by an object.

Each object class is a subclass of a network object class shown in FIG. 6A. An instance of the network object class has a first slot 220 which is a list of children objects of a given object. Slot 222 is a list of groups in which this object is a member. A list of actions that are associated with this object is found in slot 224. Slot 226 is an identifier of the object. Slot 228 is an identifier of any parent object of this object.

A particular kind of network object is a class of objects having Internet protocol (IP) addresses shown in FIG. 6B. This object class is called the network IP object class. All remaining object types in a computer network are of the network IP object class. An instance of the network IP object class has an IP address 230, an minimum IP address 232, a maximum IP address 234, a broadcast IP address 236 which is used for routing broadcast packets, and a gateway for the IP packets as indicated in slot 238. A net mask value is stored in slot 240 and to indicate the need for any external gateway routing. The machine, gateway and LAN object classes are all types of network IP objects. Each of these objects may have varying graphical display and thus have a different type. Otherwise, these objects are generally the same for the purposes of the configuration provided by the present invention.

The network device 26 or 28 that may be configured may be represented by the site object shown in FIG. 6C. The site object has a slot 250 that is a Boolean value which enables or disables remote configuration. The IP addresses of remote sites which can be configured by this site are listed in list 252. An Ethernet configuration is enabled by the Boolean value 254 and the IP of the Ethernet is in slot 256. The number of LAN ports connected to the device is an integer represented at 258. An identifier of the site is in slot 260. The port which the site listens to in order to effect communication with other sites is in slot 262.

An enterprise object represents the entire enterprise. Its data structure shown in FIG. 6D includes a slot 200 indicating a default action for processing internal traffic. This value is a Boolean value indicating whether all internal traffic is disabled or enabled in the absence of any other actions which would override this setting. A similar slot 202 is used as the default value for actions for external traffic, i.e., traffic between objects within the network and an external network such as the Internet. Slots 204 and 206 indicate whether Intranet or Internet traffic should be logged. Slot 208 indicates what is to be done with non-IP packets such as whether encapsulation and encryption should be performed. A block broadcast value is a Boolean value indicating whether broadcasting of packets is permitted in the network. The encryption slot 212 indicates the type of encryption that is used within the network to provide security if transmission is over a publicly-accessible network. Slots 214 and 216 indicate the ports through which the communication may occur among site objects. The first port is for external devices while the second port is for devices of the same type.

Figure 4:
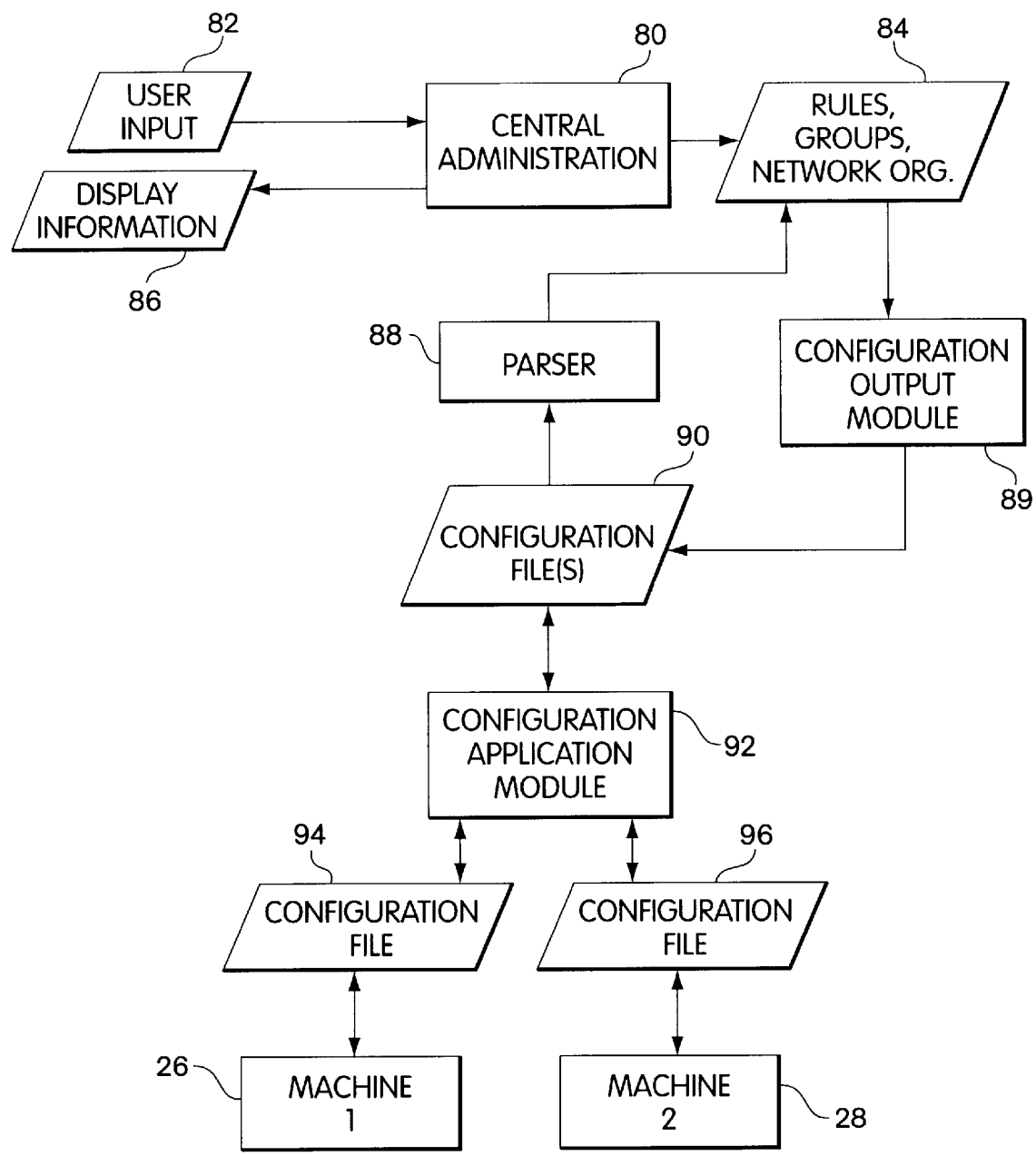
FIG. 4 is a data flow diagram illustrating one embodiment of a system which configures the computer network.

The definition of a computer network in such an object-oriented manner and its application to configuring of the computer network can be performed using a system such as shown in FIG. 4. FIG. 4 illustrates a central administrator 80 which receives user input 82 to define rules, groups and the network organization as indicated at 84. Appropriate display information is sent to the user as indicated at 86 for a graphical user interface described below in connection with FIGS. 5A and 5B. The object definitions, rules and network structure are passed to a configuration output module 89 which outputs a configuration file 90 which is used by the network devices, e.g., 26 and 28, to define the access permitted through the network. The configuration file represents the objects 84 in the form of a flat file or other data structure to simplify processing into a filter table used by the network devices as described below in connection with FIGS. 10A–D. The configuration file 90 may be processed by a parser 88 to produce the object definitions, rules and network structure information 84. A configuration application module 92 receives the configuration file 90 and transmits it to each of the network devices, e.g., 26 and 28 as indicated at 94 and 96. Alternatively, the module 92 may read a configuration file from a network device. The central administrator will be described in more detail below, along with the process of generating a filter table from the configuration file.

A suitable computer system to implement the present invention typically includes an output device which displays information to a user. The computer system includes a main unit connected to the output device and an input device, such as a keyboard. The main unit generally includes a processor connected to a memory system via an interconnection mechanism. The input device is also connected to the processor and memory system via the connection mechanism, as is the output device.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, audio input and scanner. It should be understood the invention is not limited to the particular input or output devices used in combination with the computer system or to those described herein.

The computer system may be a general purpose computer system which is programmable using a high level computer programming language, such as C++. The computer system may also be specially programmed, special purpose hardware. In a general purpose computer system, the processor is typically a commercially available processor, of which the series x86 processors, available from Intel, and the 680X0 series microprocessors available from Motorola are examples. Many other processors are available. Such a microprocessor executes a program called an operating system, of which WindowsNT and 95, UNIX, DOS and VMS are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

It should be understood the invention is not limited to a particular computer platform, particular processor, or particular high-level programming language. Additionally, the computer system may be a multiprocessor computer system or may include multiple computers connected over a computer network.

Figure 5A:
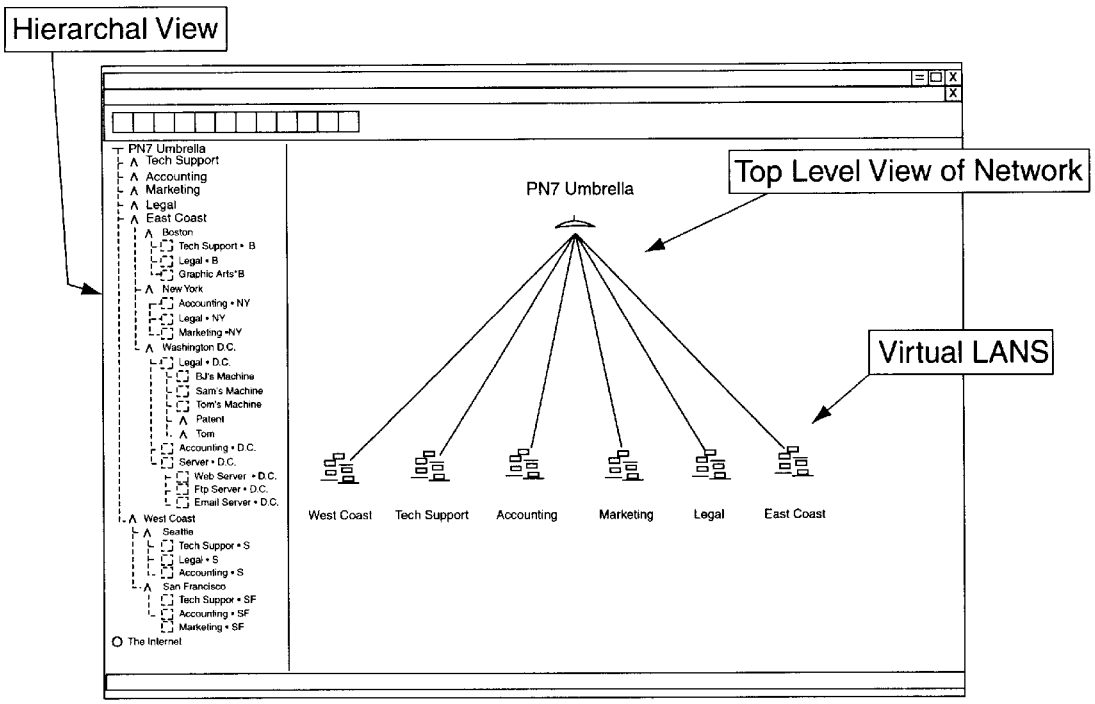
FIGS. 5A and 5B illustrate, by way of example, the user interface of the central administrator in FIG. 4.
Figure 5B:
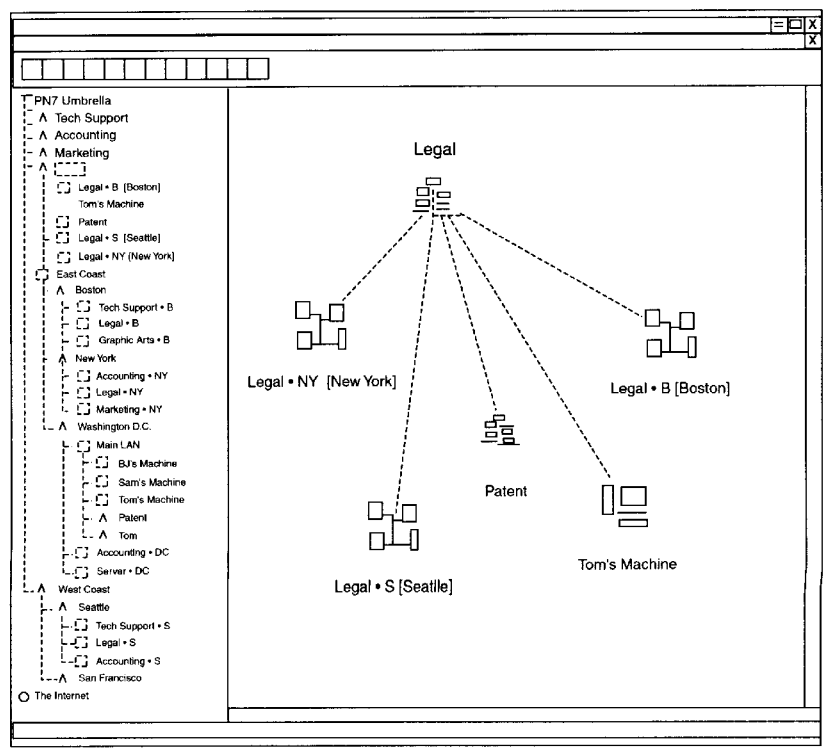

A graphical user interface for the central administrator 80 will now be described in connection with FIGS. 5A and 5B. The graphical user interface has two views: a list view and a topological view. The list view illustrates the computer network using a hierarchical outline, as shown at 100. The topological view, associated with the list view, shows, for a selected object, those objects connected to or associated with the selected object, as indicated at 102. The list view may be expanded or contracted to show connectivity or association in the network at several levels of the hierarchy. An object in the topological view may be selected to change the selected object in the list view. The topological view changes to illustrate objects associated with the newly selected object. Similarly, an object in the list view may be selected to change the selected object in the topological view.

With the object oriented definition of the computer networks such as described above, commands may be provided to create, modify or delete objects in connection with either of the two views. In addition, an object may be selected in order to define associated actions for configuring the network. In the following example, the actions are filters defined by rules and applied to communications between objects. In general, however, an action may be any action that may be performed on or by an object or on communication to or from an object. Given the definitions of the data structures above for each of the available objects, the provision of a graphical user interface as shown in FIGS. 5A and 5B to create, modify or delete any of these objects is well within the skills of one of ordinary skill in the art.

Figure 7A:
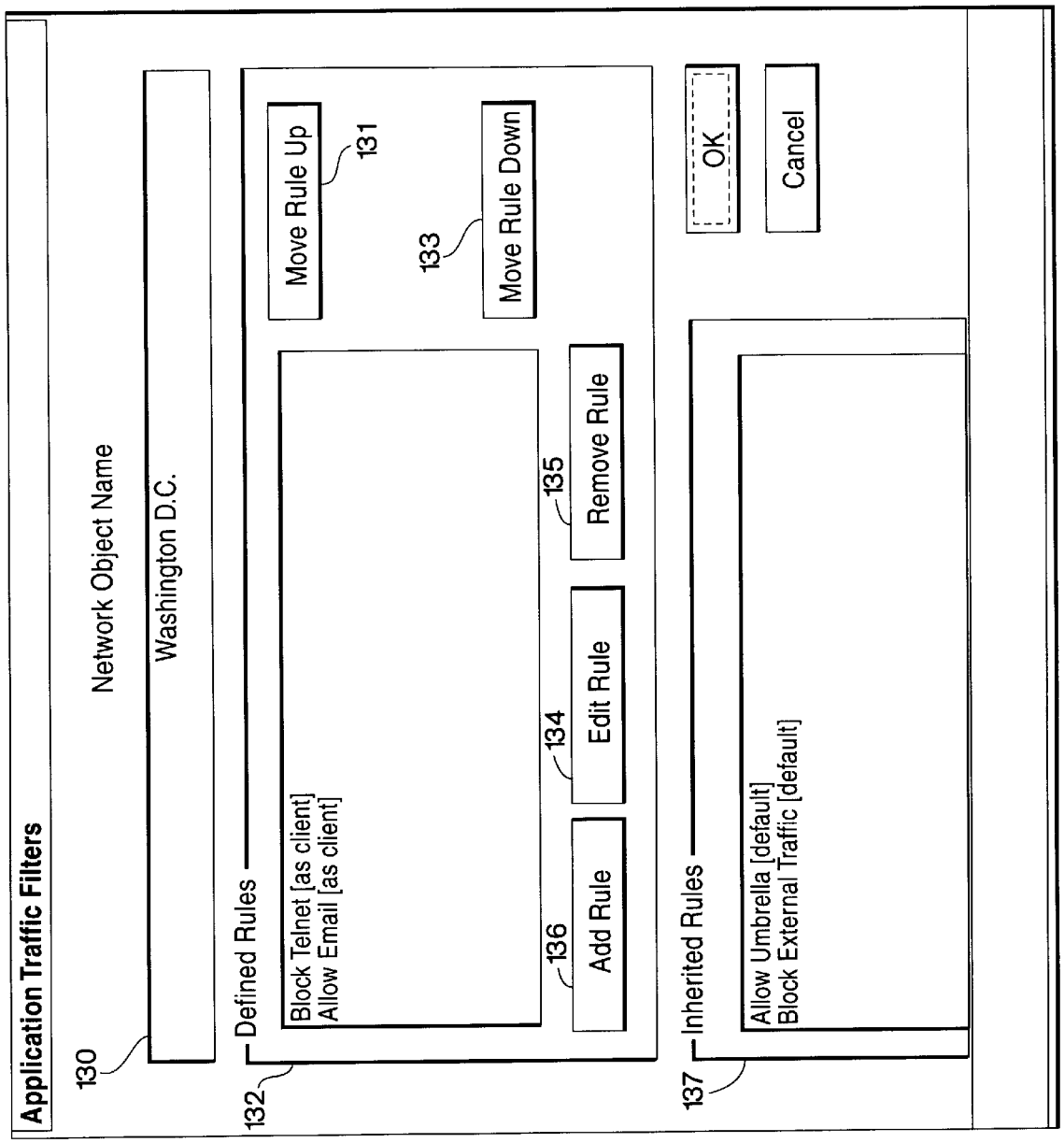
FIGS. 7A, 7B and 7C illustrate a graphical user interface for specifying an action associated with an object in the network.
Figure 7B:
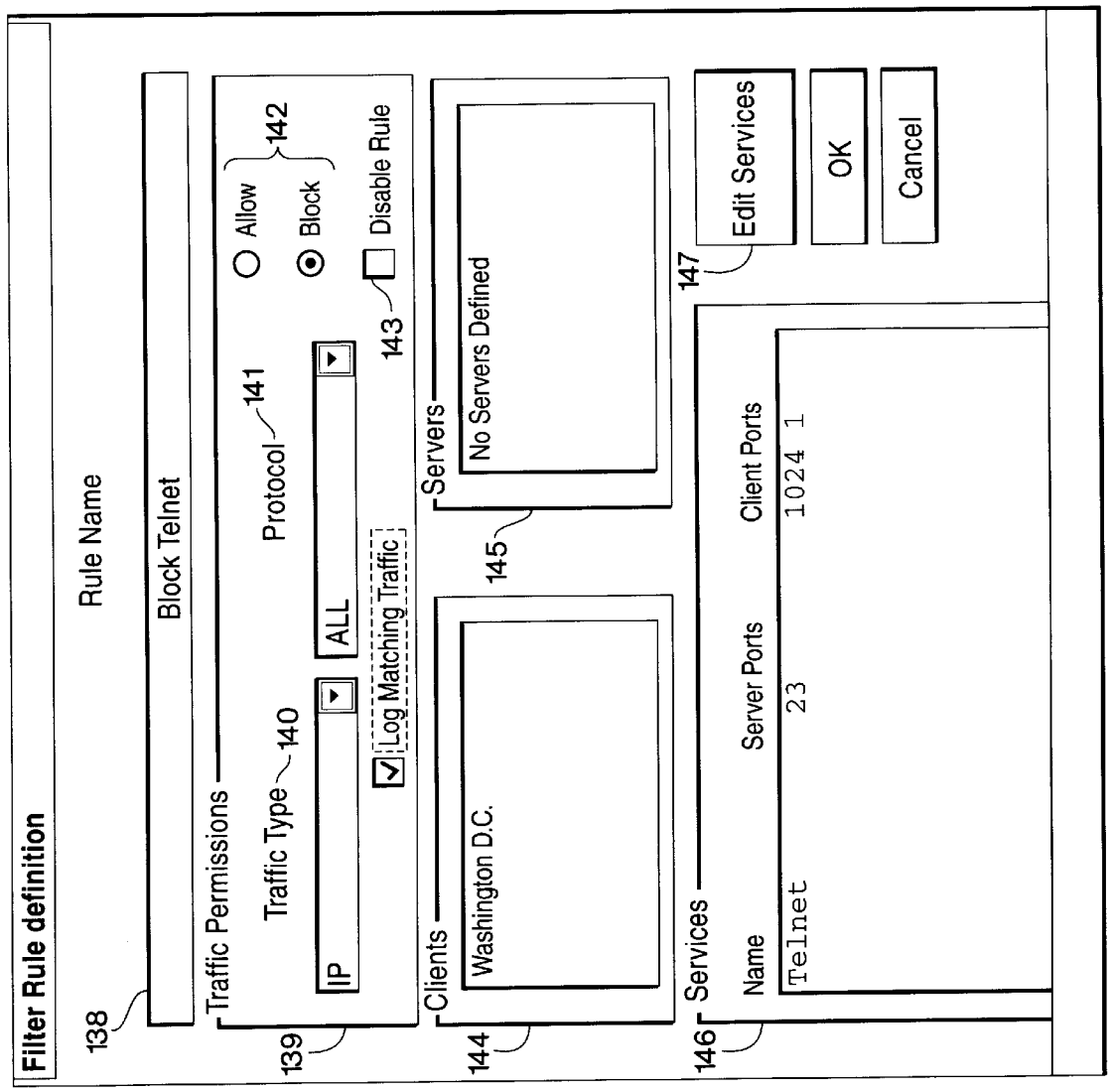
Figure 7C:
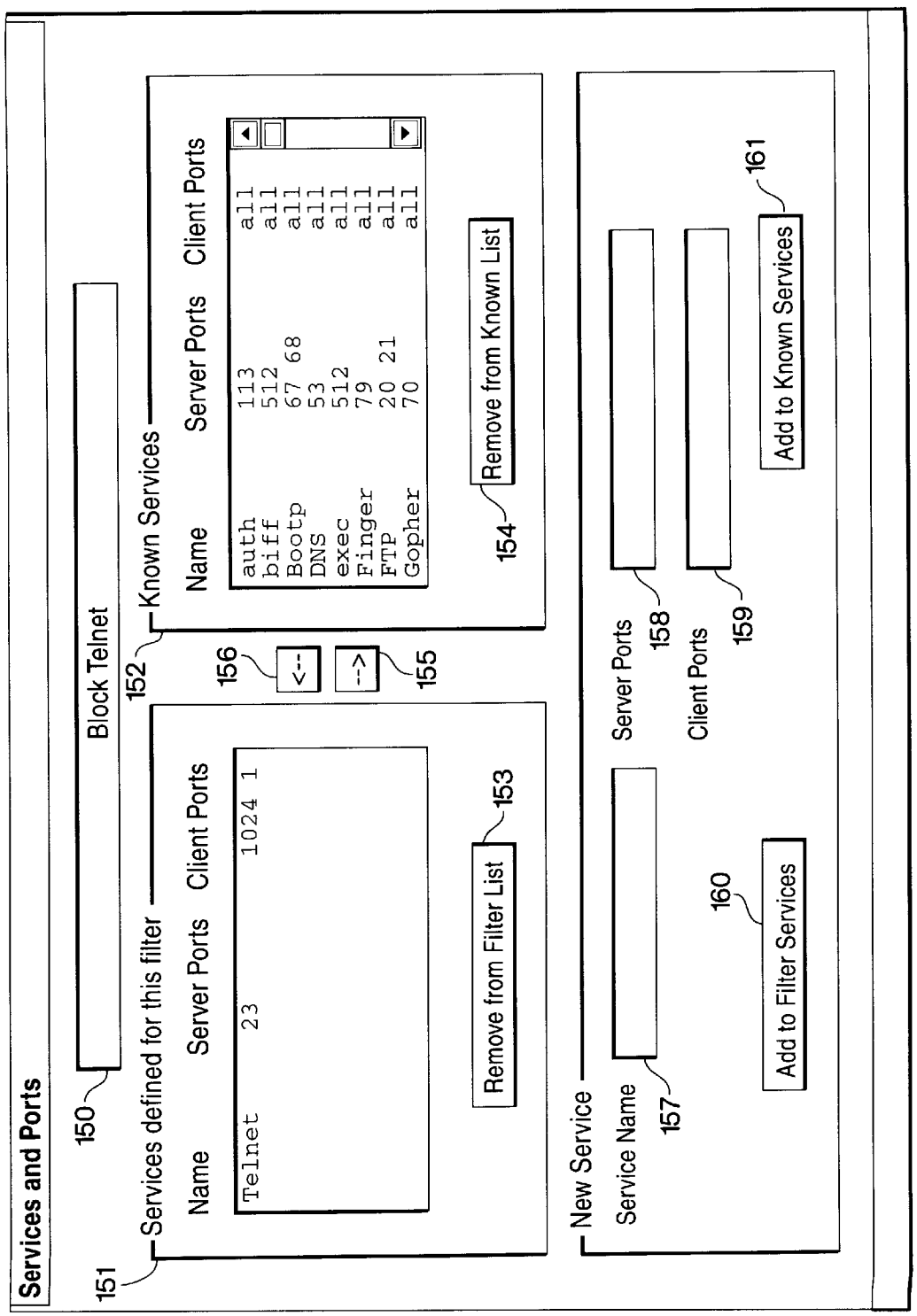

FIGS. 7A–C show a sample graphical user interface for defining a rule to be associated with an object. In FIG. 7A, the rules defined for an object 130 are specified at 132. The order of the rules in the list 132 can be changed by selecting a rule and moving the rule up and down using inputs 131 and 133. A selected rule may be edited or removed, as indicated at 134 and 135. A new rule may be added as indicated at 136. Rules inherited from other objects are illustrated at 137. An interface for adding a new rule is shown in FIG. 7B. The rule is given a name, as indicated at 138. Traffic permissions are indicated at 139. A traffic permission includes a traffic type which specifies a network layer protocol. The protocol 141 specifies a transport layer protocol. The user may also indicate the radio buttons 142 whether the traffic should be allowed or blocked. It is also possible to disable the rule, as indicated at 143. The clients for which the rule applies are specified at 144. The servers for which the rule is defined are specified at 145. In this example, all traffic from a network object named "Washington, D.C.," acting as a client, is blocked. Note that this rule would have no effect on receiving similar traffic. The service that is blocked by this rule is "telnet" access, as indicated at 146. The services specify a name, server port, and client ports, where the service will occur. The services for a rule may be specified by selecting button 147 which invokes the graphical user interface shown in FIG. 7C. The services and ports window for a filter show the filter name at 150. The services actually defined for the filter are shown at 151. A list of known services is provided at 152. A user may select a service in region 151 and remove the service from the list, as indicated at 153. A service also may be selected at 152 and removed from the list of known services, as indicated at 154. A service listed at 151 may be moved to the known services as indicated at 155. Similarly, a known service may be moved to the services defined for the filter as indicated at 156. A new service may be added by providing a service name, as indicated at 157, and the server ports and client ports as indicated at 158 and 159 respectively. The new service may be added to the current filter services 151, as indicated at 160 or may be added to the known services 152, as indicated at 161.

Rules are represented using three objects. The first object is a rule use object (FIG. 8A) which defines the mapping between rules and network objects. The rule use object includes an integer 270 representing an identifier for the rule, the types of rule, indicating whether the object to which the rule is associated is a server or client has indicated at 272. The object identifier of the rules which is applied is found in slot 274.

The rule is actually represented by a rule object (FIG. 8B) which has an identifier slot 280. A slot 282 is used to allow or drop packets. The rule may be disabled by setting the value in slot 284. A slot 286 indicates whether activity of the rule should be logged. This is typically significant where the rule is causing packets to be filtered out. The network and transport layer protocols are then identified in slots 288 and 290 to which the rule will be applied. A list of servers for the rule and list of clients for the rule are in slots 292 and 294. The list of services allowed by the rule are stored in slot 296.

Contents of slot 296 in the rule object is a service list object which is a list of service maps. The service map object is a collection of traffic types including a layer for protocols. For example, FTP traffic occurs between high-numbered ports on the clients to low-numbered ports on the server (e.g., ports 20 and 21). A service map object (FIG. 8C) includes a character indicating the service at 300, a list of service ports 302 and a list of client ports 304.

As can be seen from the graphical user interface shown in FIGS. 7A–C, the various values of these slots are input by the user and stored directly in these data structures.

Another object represented in this system is a filter object (FIG. 9) which represents a range of network traffic together with a code defining whether matching traffic (packets) should be allowed or blocked. The range is defined by location codes that indicate where the traffic came from (one of the LANs, one of the site or network devices, or external traffic) and where the traffic is going, together with some of the routing data that may be encoding in a packet such as the source IP address, destination IP address, source port, destination port, and type of traffic (the layer 3 protocol). Accordingly, the filter object has a slot 310 indicating whether the filter allows or blocks traffic. Traffic applicable to this filter may be logged as determined by the value stored in slot 312. A location code indicating where the packet came from is stored in slot 314. Similarly, slot 316 indicates where the packet is going. The source and destination ports of the packet are stored in slots 318 and 320. An indication of the appropriate protocol at the network and transport layers are stored respectively in slots 322 and 324.

Given the set of actions associated with the object defining the configuration of the network, these actions and object definitions are processed to define a filter table for each network device which is loaded into each of the network devices to configure the network. This process of translating the actions, object definitions and network configuration into filters will now be described in more detail in connection with FIGS. 10A–10D.

FIG. 10A is a pseudocode for turning an object representation into a route table. A route table is generated for each site, with respect to other site objects in the system. For each site, an object may be in one of the local area networks connected to the site, a different site, or an external object. A route is an IP address range in a corresponding destination code. For a given site P, as indicated in step 300, each local area network L attached to the site is processed in step 302. For each descendent D of the local area network, as determined in step 304, a route is added to the route table for the descendent D with D's address range in step 306. Single IP objects have a range where the minimum and maximum are the same. The route also includes the destination code for the local area network L, as indicated at 308. For each other site P in the enterprise, as determined in step 310, each descendent of the site is processed in step 312. A route is added for each descendent with the descendent's address range and a destination code for the site in step 314. In this step, single IP objects have a range where the minimum and maximum address are the same.

The filter table is generated according to the process shown by the pseudocode shown in FIG. 10B. This process also happens for each site. A filter defines ranges of addresses that may or may not match a packet and destination source codes. The filter table may be optimized but that is not necessary. In this process, for each site P as determined in step 320, each active local area network connected to the site is analyzed in step 322. First, a list of descendants D of the local area network L is constructed such that the closest descendants are at the end of the list (step 324). For each descendent in this list, as determined in step 326, relevant filters for the descendent are added in step 328. Relevant filters for the site P are then added in step 330. Relevant filters for the entire enterprise are then added in step 332. The steps of adding these relevant filters in steps 328, 330 and 332 will now be described in connection with FIG. 10C.

First, a list is constructed of all the rules that may apply to an object O in step 340. This list is constructed by first listing the object then all of its ancestors with the nearest ancestor first on the list in step 342. For each entry in the list, all rules for the object are added to the rule list in step 344. For each rule R on the rule list, as determined in step 346, a rule is applied according to whether the object is a server or client for this rule. If the object is a server for this rule as determined in step 348, for each client for this rule, as determined in step 350, the rule is applied to the server and its clients in step 352. This step is described in more detail below in connection with FIG. 10D. If the object is a client for this rule as determined in step 354, for each server for this rule, as determined in step 356, the rule is applied to the server and the client in step 358. This step also is described in FIG. 10D.

The process of applying a rule to given server S and client C will now be described in connection with FIG. 10D. Two filters F1, F2 are generated for this rule. These filters are generated by generating a location code for the server S. The "from" slot of filter F1 and the "to" slot of filter F2 are filled in step 362. A location code then is generated for the client. The "from" slot of filter F2 and "to" slot of filter F1 are filled in step 364. The address range of the server is generated. The source slot of filter F1 and the destination slot of filter F2 are filled in step 366. The address range of the client is generated. The source slot of filter F2 and the destination slot of filter F1 are filled in step 368. A network and transport code for the rule are placed in slots of both filters F1 and F2 in step 370. For each server port range of the rule, as determined in step 372, the source slot in filter F1 and destination slot in filter F2 are filled in step 374. For each client port range of the rule, as determined in step 376, the source slot of filter F1 and destination slot of filter F2 are filled in step 378. Filters F1 and F2 are then added to the filter table in step 380.

Given the definition of the filters F1 and F2, they may be formatted as appropriate for any given network device to which they may be applied using techniques known in the art. In addition, it is preferable to apply the configuration simultaneously to machines in the entire network. This can be performed in several ways. First of all, each network device may be addressable on the network to receive a message containing the filter table from the central administrator. Additionally, one network device may be designed to receive a filter table from the central administrator and to broadcast this filter table to other network devices in the system, also using appropriate authentication and encryption to provide security. This central administrator also may be connected directly to a network device or may communicate with the network device over the actual computer network.

By providing a system which allows for the definition of various groups of distributed machines within an arbitrary computer network, and which provides for the inheritance of rules, the configuration of a computer system may be managed centrally and in an intuitive manner. The definition of the computer network in this manner also permits monitoring of computer network traffic by providing a mechanism that can compile logged information about network traffic through each of the machines in the network.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A computer implemented process for simultaneously configuring parameters of devices in a computer network, comprising the steps of:

defining a hierarchy of logical groups of objects corresponding to machines and groups of machines in the computer network;

defining rules associated with the objects, wherein a rule specifies a type of traffic, a communication protocol, and indication of whether the rule is associated with the object acting as a sender or as a receiver of information, wherein each object inherits all rules associated with each group in which it is a member;

processing the defined rules to produce a set of control parameters for machines in the computer network; and applying the control parameters to machines in the computer network.

2. The process of claim 1, wherein the parameters of the machines are configuration parameters of software to be executed on the machines.

3. The process of claim 1, wherein the parameters of the machines are security configuration parameters indicating permitted and prohibited communication paths between machines in the network.

4. The process of claim 1, wherein machines are organized by groups and rules defining configuration parameters may be defined for a group, wherein such configuration parameters are inherited by all machines within the group.

5. The process of claim 4, wherein a group is defined by a common physical connection.

6. The process of claim 4, wherein a group contains a collection of machines that are not within the same physical group.

7. The process of claim 4, wherein the groups may be defined as groups of groups of machines, wherein rules defined by one group are inherited by all machines within any subgroups.

8. A computer system for simultaneously configuring parameters of devices in a computer network, comprising:

means for defining a hierarchy of logical groups of objects corresponding to machines and groups of machines in the computer network;

means for defining rules associated with the objects, wherein a rule specifies a type of traffic, a communication protocol, and indication of whether the rule is associated with the object acting as a sender or as a receiver of information, wherein each object inherits all rules associated with each group in which it is a member;

means for processing the defined rules to produce a set of control parameters for machines in the computer network; and means for applying the control parameters to machines in the computer network.

9. The computer system of claim 8, wherein the parameters of the machines are configuration parameters of software to be executed on the machines.

10. The computer system of claim 8, wherein the parameters of the machines are security configuration parameters indicating permitted and prohibited communication paths between machines in the network.

11. The computer system of claim 8, wherein machines are organized by groups and rules defining configuration parameters may be defined for a group, wherein such configuration parameters are inherited by all machines within the group.

12. The computer system of claim 11, wherein a group is defined by a common physical connection.

13. The computer system of claim 11, wherein a group contains a collection of machines that are not within the same physical group.

14. The computer system of claim 11, wherein the groups may be defined as groups of groups of machines, wherein rules defined by one group are inherited by all machines within any subgroups.

15. A method for configuring a computer network, comprising the steps of:

defining a hierarchy of logical groups of distributed network objects corresponding to machines and groups of machines in the computer network, defining configuration rules associated with the network objects, processing the defined rules to produce a set of parameters for the machines and groups of machines in the computer network; and simultaneously applying the parameters to two or more machines in the computer network.

16. The method of claim 15, wherein each rule is a security rule which specifies a type of traffic, a communication protocol, and indication of whether the rule is associated with the network object acting as a sender or as a receiver of information.

17. The method of claim 15, wherein a network object defines a logical group of distributed network objects.

18. The method of claim 17, wherein network objects are defined as a hierarchy of logical groups.

19. The method of claim 18, wherein a logical group may include another logical group.

20. The method of claim 15, where a rule specifies a configuration of the machine or group connected to the object associated with the rule.

21. A computer system for configuring a computer network, comprising:

means for defining a hierarchy of logical groups of distributed network objects corresponding to machines and groups of machines in the computer network, means for defining configuration rules associated with the network objects, means for processing the defined rules to produce a set of parameters for the machines and groups of machines in the computer network; and means for simultaneously applying the parameters to two or more machines in the computer network.

22. The computer system of claim 21, wherein each rule is a security rule which specifies a type of traffic, a communication protocol, and indication of whether the rule is associated with the network object acting as a sender or as a receiver of information.

23. The computer system of claim 21, wherein a network object defines a logical group of distributed network objects.

24. The computer system of claim 23, wherein network objects are defined as a hierarchy of logical groups.

25. The computer system of claim 24, wherein a logical group may include another logical group.

26. The computer system of claim 21, where a rule specifies a configuration of the machine or group connected to the object associated with the rule.

* * * * *